May 18, 1965 K. UTZ 3,184,358
METHOD OF FORMING LAMINATED PLASTIC TUBING
Filed June 20, 1961 3 Sheets-Sheet 2

INVENTOR.
Kastulus Utz
BY Richard Low
 Ag't

May 18, 1965 K. UTZ 3,184,358
METHOD OF FORMING LAMINATED PLASTIC TUBING
Filed June 20, 1961 3 Sheets-Sheet 3

INVENTOR.
Kastulus Utz
BY Richard Graf
Ag't

United States Patent Office 3,184,358
Patented May 18, 1965

3,184,358
METHOD OF FORMING LAMINATED
PLASTIC TUBING
Kastulus Utz, Freising, Germany, assignor, by mesne assignments, to Multifol Patentverwertungs A.G., Chur, Switzerland, a corporation of Switzerland
Filed June 20, 1961, Ser. No. 118,313
12 Claims. (Cl. 156—244)

This invention relates to the extrusion of thermoplastics and is more particularly concerned with the production of laminated tubing by simultaneous extrusion of the several layers and bonding thereof immediately upon extrusion.

In a known extrusion arrangement, two or more layers of thermoplastic material are simultaneously extruded through concentric annular shaping orifices of a die and are then bonded to each other by pressure while hot. The strength of the bond so produced may be quite low if the materials of the two layers are chemically different, and particularly if one of them consists of a substantially non-polar material such as polyethylene.

The primary object of this invention is to generally improve laminated plastic tubing and to provide a method for producing such tubing.

One object of the present invention is to improve the strength of the bond between the several layers of laminated plastic tubing. Associated with this object is the object to provide a method for producing laminated tubing from layers the materials of which normally do not or do not readily bond together.

Other objects of my invention center about plastic laminated tubing of superior qualities, compared with known kinds of such tubing. The invention aims not only at stronger bonds but also at laminations of improved imperviousness to gases, water vapors, etc.

A more specific object is the improvement of the bond between layers of laminated tubing in which one of the layers consists of polyethylene or other substantially non-polar thermoplastic material which has heretofore been difficult to bond to other thermoplastics.

Figure 1:
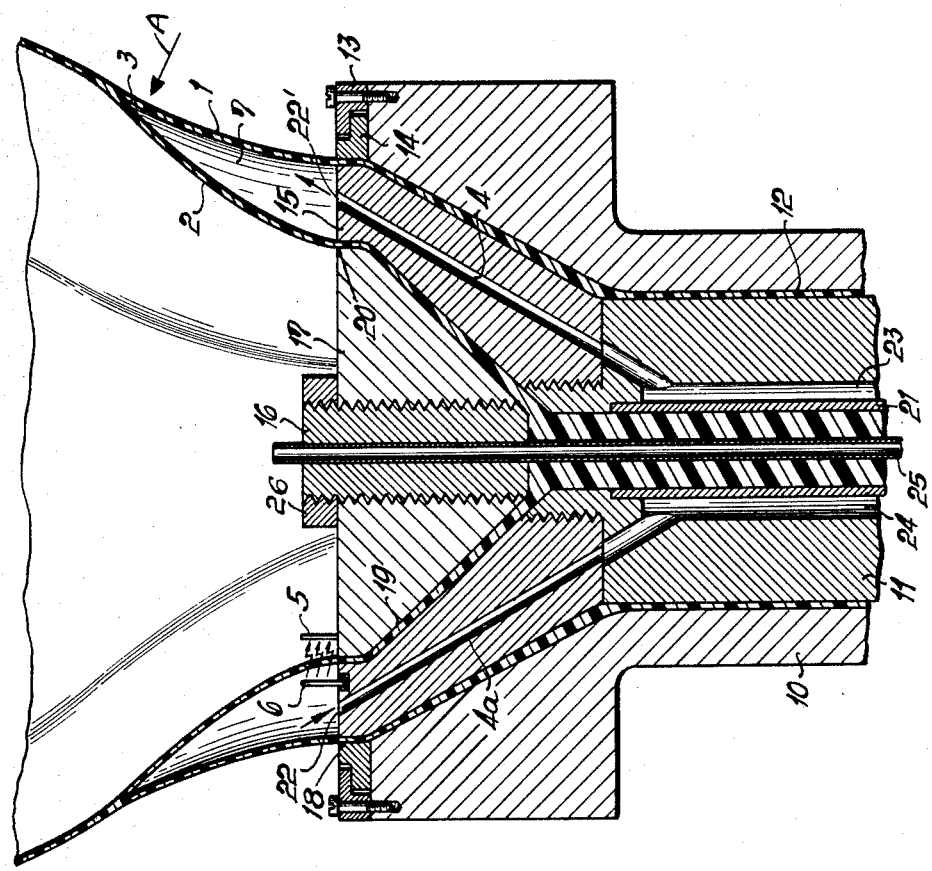
Figure 2:
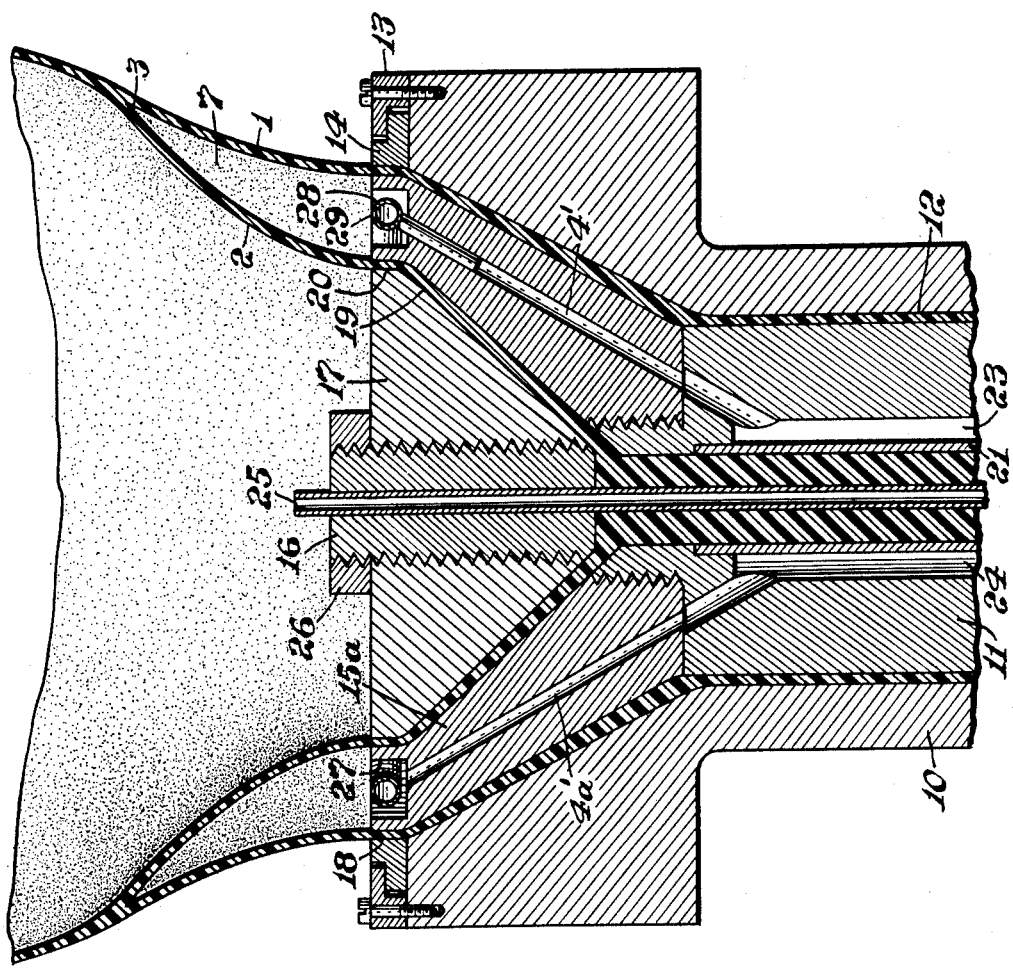
Figure 3:
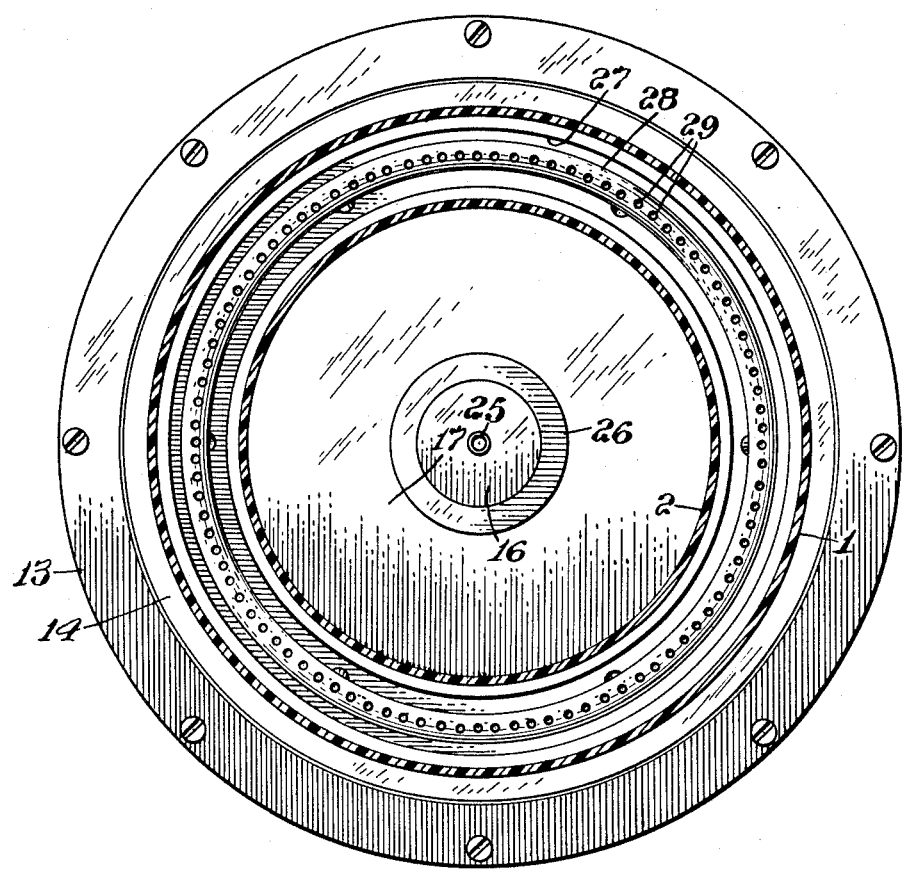

Other objects and many of the attendant advantages of this invention will be readily appreciated as the same becomes better understood by reference to the following detailed description when considered in connection with the accompanying drawings in which:

FIG. 1 is a section through a die assembly of an extruder, embodying features of the invention;
FIG. 2 is a similar view of a modified die assembly; and
FIG. 3 is a top plan view of the die assembly of FIG. 2.

The apparatus illustrated in FIG. 1 is the delivery end, for instance, of a screw extruder of largely conventional design and is shown in section taken in a plane of the axis of the cylinder and the main screw, which are not shown in themselves.

A die adapter 10 is fastened to the cylinder head 11 in a manner well known in itself and not further illustrated. Coaxial portions of the adapter 10 and the head 11 enclose a cylindrical portion of a channel 12 through which a first thermoplastic material is extruded in condition of plasticity. A retaining ring 13 which is bolted to the face of the adapter 10 holds an annular die plate 14 adjacent to the annular orifice 18 of the channel 12 and permits the uniformity of the orifice width to be adjusted by shifting the plate 14. An intermediate die 15 which has the shape of a hollow frustum of a cone is threadedly mounted on an axial extension 16 of the cylinder head 11 which also threadedly carries a conical inner die member 17.

The intermediate die member 15 together with the die adapter 10 defines a conical portion of the channel 12 which connects the aforementioned cylindrical portion thereof with the orifice 18. The inner conical face of the intermediate die member 15 together with the inner die member 17 defines another conically shaped channel 19 which terminates in an orifice 20 concentric with the orifice 18 and of smaller diameter. The channel 19 communicates with an axial bore 21 in the cylinder head through which a second thermoplastic material is extruded separately from the material discharged through the channel 12.

The intermediate die member 15 has several internal ducts 4, 4a which terminate in respective openings 22' and 22 in the face of the dies between the two shaping orifices 18 and 20. The ducts 4 and 4a respectively communicate with axial channels 23, 24 through which a gas may be respectively admitted to a space adjacent the die face, and withdrawn from that space. The channel 23 serves as the gas-admitting channel while the channel 24 is the exhaust channel.

A tube 25 which extends in the common axis of the several die members enumerated above permits a fluid under pressure to be admitted to the space adjacent the center of the face of the dies. It will be appreciated that the lower ends of the channel 12 and the axial bore 21, as viewed in FIG. 1, are connected in the usual manner to extruding spaces from which softened plastic is supplied under pressure, and that the lower ends of the channel 23 and tube 25 are respective connected to pumps or storage containers, not shown, which respectively supply the gas and the pressure fluid, whereas the channel 24 may be vented to the atmosphere or a collecting vessel. While only one duct 4 and one duct 4a are shown in FIG. 1 to lead outwardly from the channels 23, 24, it is preferred to provide several ducts having respective openings 22', 22 in the annular portion of the die face between the orifices 18 and 20.

The intermediate die member 15 and the inner die member 17 are held in position by a ring 26 threaded on the axial extension 16.

Two electrodes 5 and 6 are respectively mounted on the inner die member 17 and the intermediate die member 15. The electrode 6 is insulated from the die member 15, but the electrode 5 is grounded to the metal structure of the extruder. A source of high-frequency alternating potential (not shown) is conductively connected to the electrodes to generate a corona discharge between the electrodes as indicated by the arrows.

The afore-described apparatus operates as follows:

Softened thermoplastic material supplied through the channel 12 and the axial bore 21, respectively, is extruded through the orifices 18 and 20 to form two tubular film formations or layers 1 and 2, the inner layer 2 of which is enclosed within the outer layer 1. Fluid, such as air, admitted under pressure into the space ahead of the die face through the tube 25, expands the inner layer 2 as it moves away from the orifice 20 during extrusion so that it eventually makes contact with the outer layer 1 as shown at 3 where the two layers are bonded together by the pressure of the fluid discharged from the tube 25 since they are still hot and capable of being bonded together. A portion each of the inner face of the outer layer 1, and of the outer face of the inner layer 2, thus define interiorly an annular space 7. Particular portions of the referred inner and outer faces define the space 7 temporarily only since they travel forward as the extrusion continues.

While the method so far described is quite satisfactory when both of the layers 1 and 2 consist of polyvinyl chloride or other materials which can readily be bonded to each other by relatively low pressure when still hot, it is frequently ineffective when the two layers are of dissimilar or nonbonding materials, and particularly when one of the materials is of polyethylene and the other consists of more polar material, such as nylon, polyvinyl chloride, polystyrene, a polyurethane, or the like.

If polyethylene is to be bonded to such polar materials, I provide a special gas atmosphere in the annular space 7 bounded by the die face and the adjacent faces of the two layers 1 and 2. The atmosphere is reactive with the surface of at least one of the two plastic layers in the annular space 7 and thus alters the chemical nature, and frequently also the physical properties, of the surface. Polyethylene is resistant to most liquid materials, but its surfaces can be modified by gaseous reactants, when at high temperature, to change their chemical and physical characteristics and to improve the strength of the pressure bonds formed between a treated surface and another thermoplastic surface. This treatment may additionally modify the gas or water vapor permeability of the interface to produce an intermediate layer and to result in a laminate having valuable properties not otherwise readily available. Thus, the method of the invention is beneficial also when applied to two layers which would form a bond of adequate mechanical strength when untreated.

The modification shown in FIGS. 2 and 3 is identical with the embodiment of FIG. 1, as far as most of the parts are concerned. The existing differences are associated with the admission of the reactive gas to the space 7 and the withdrawal of exhaust gas therefrom. By "exhaust" gas, the unreacted portion of the reactive gas and reaction products in gaseous form are meant. The intermediate die member 15a is provided with an annular groove 27, and disposed within this groove is a ring-shaped tube 28. Ducts 4' guide the gas to the tube 28, from which it is evenly distributed through apertures 29 to the space 7. The apertures 29 are provided on top of the tube 28 as can be seen from FIG. 3. Ducts 4a' which serve to withdraw exhaust gas from the space 7 open into the bottom of the groove 27.

The construction of FIGS. 2 and 3 offers the advantages of quickly supplying any reactive gas to the space 7 and of evenly distributing the gas in the space. By providing the tube 28 with a large number of apertures 29 therein the required quantity of reactive gas is ensured to be momentarily available, even with, say, four spacedly arranged ducts 4' only.

The following examples are further illustrative of the method of the invention, and it will be understood that the invention is not limited to the specific examples.

*Example 1*

Nylon is extruded through the orifice or outer nozzle 18 of either of the two modifications shown and polyethylene is extruded from an auxiliary press through the orifice or inner nozzle 20, the polyethylene having a melt index of approximately 1.5. Air is injected into the space within the polyethylene tubing through the tube 25 at elevated pressure to expand the polyethylene tubing which is still hot and readily deformable. Substantially pure oxygen is continuously fed to the annular space 7, for instance, through ducts 4 of FIG. 1 and the unreacted portion of the oxygen together with products of its reaction with the polyethylene tube 2 and/or the nylon tube 1 is continuously exhausted through the ducts 4a.

The die assembly is heated at 240° to 260° C. The two tubes, immediately upon their extrusion, have about the same temperature. The nozzles may be of any suitable size. With an outer nozzle of a diameter of 110 mm. and an inner nozzle of a diameter of 80 mm., tubes can be produced which vary in diameter between 100 mm. and 300 mm. and in wall thickness between 0.02 mm. to 0.3 mm. The mass passing through the nozzles per minute may vary between 100 and 500 grams. Laminated two-layer tubing thus produced may have a thickness varying approximately between 20μ and 300μ. The speed of flow of the oxygen admitted through the ducts 4 to the space 7 is approximately 1000 to 2000 ccm./min. It will be appreciated that an increase of the mass calls for an increase of the oxygen to be passed through the ducts 4.

The laminated tubing produced by bonding of the polyethylene layer with the nylon layer at 3 is taken off in a conventional manner so that the space defined by the die face and portions of adjacent faces of the layers 1 and 2 remains sealed. After cooling, a sample of flat material of a width of 10 mm. showed a resistance to layer separation of 10 to 100 grams. When no special atmosphere is provided in the annular space 7, the strength of the bond between polyethylene and nylon is so low that it cannot be measured by any of the standardized testing methods.

The reaction taking place and the chemical bond which is established between polyethylene and nylon in the presence of relatively pure oxygen is believed to be of the type shown below:

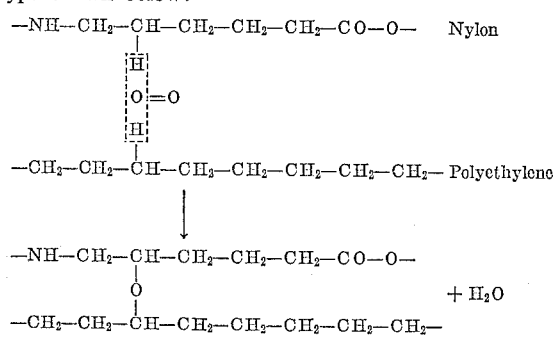

I proceed similarly and similar results are obtained if instead of nylon polycaprolactam nylon is used.

*Example 2*

The materials employed and the procedure are the same as in Example 1 but the stream of oxygen is passed through a corona discharge in a conventional ozoning tube to enrich it with a small amount of ozone before it is admitted to the space 7.

Very good results are already obtained when the oxygen-ozone mixture contains about 3% ozone only. The bond produced between the polyethylene layer and the nylon layer is so strong that it cannot be broken because the polyethylene film breaks first.

The same results are obtained when ozone is generated by a high voltage discharge in oxygen between the electrodes 5 and 6, or when the oxygen fed to the space 7 is enriched with ozone obtained by thermal decomposition of persulfuric acid. Regardless of its origin, ozone accelerates the rate of the bonding reaction and increases bond strength even when present in small amounts. The reaction taking place between the polyethylene and nylon is similar to that of Example 1 and is believed to follow the following pattern:

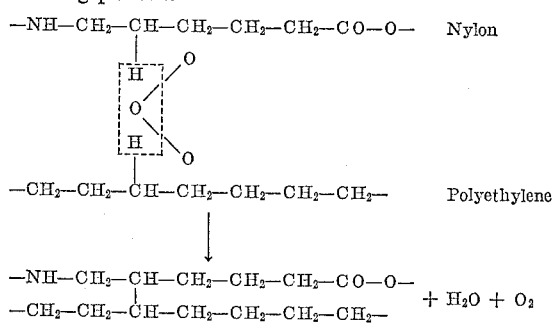

*Example 3*

The same procedure is followed as in Example 1 and the same plastic materials are employed. The annular space 7, is, however, filled with chlorine which is fed to the space through the ducts 4 or 4' in substantially pure condition. Chlorine forms linkages between the polyethylene and the nylon surfaces by reaction with hydrogen and the removal thereof in the form of hydrogen chloride, but there is also some substitution or addition of chlorine which is incorporated into the molecular structure of the thermoplastic material. The combined effect is a modification of the plastic surfaces which permits them to form a bond which is stronger than that of the constituent layers so that failure under stress occurs across the plastic and not in the bond.

When the chlorine introduced through the ducts 4 or 4' is increasingly diluted with an inert gas such as nitrogen, the bond strength gradually decreases below the mechanical strength of the polyethylene layer.

The effectiveness of the treatment with chlorine appears to be due to a basic change of the polyethylene surface. When the above experiment is repeated with high pressure polyethylene being extruded through both orifices 18 and 20, the original specific weight of the polyethylene, which is 0.918, is increased to 0.921.

Chlorine may be replaced in the arrangement of Example 3 by the other halogens, bromine, iodine, and fluorine, and closely similar improvements in the bond strength of polyethylene to nylon are observed. When fluorine is employed at least as a part of the atmosphere in the annular space 7 the resulting changes in surface properties of the constituent layers lead to a laminated tube which has lower permeability to gases, oils, and odors than otherwise similar tubing bonded with the aid of other gases, according to the method of the invention.

Chlorine may in the method of Example 3 also be replaced by other gases which act as oxidants, such as the oxides of sulfur, nitrogen, or the halogens, by boron trifluoride or sulfuryl chloride. Because of their corrosive effects on the equipment which are not coupled with the outstanding improvements brought about by the use of fluorine, the last mentioned gaseous compounds will not usually replace chlorine to advantage although the improvements in bond strength achieved are comparable to those of chlorine.

The reaction mechanisms by which chlorine improves the bond strength between polyethylene and a polyamide material may be represented by the following formulas:

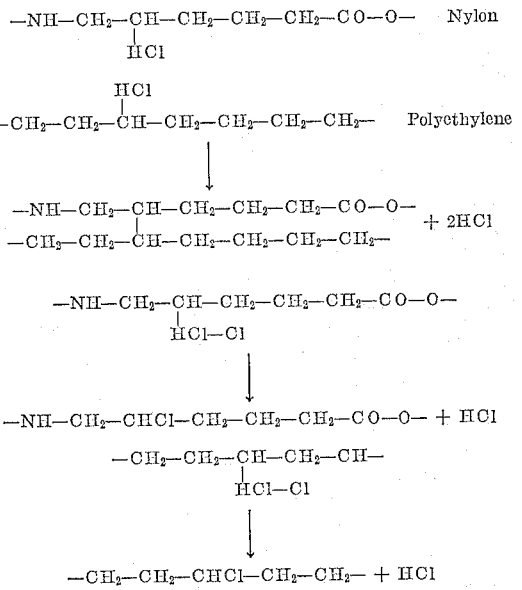

*Example 4*

The procedure of Example 1 is followed, and the same thermoplastic materials are employed, but vapors of monomeric styrene are drawn into the annular space 7 through the ducts 4, and the exhaustion of space 7 takes place through the ducts 4a. A source of high-frequency high-voltage alternating current is connected to the electrodes 5 and 6 to form a corona discharge which passes through the polyethylene layer 2 and activates the styrene vapor in the space 7 whereby hydrogen is removed from the molecular structures and the freed valency will combine with the styrene, thereby forming a bridge between the layers 1 and 2. The laminated tubing obtained has a wall which consists of layers of nylon and polyethylene and an interposed layer of polystyrene and is distinguished by superior bond strength and by low permeability. With an adequate concentration of styrene vapor in the space 7, the bond strength may exceed the mechanical strength of at least one of the bonded layers. Results obtained without the electric discharge are not much inferior.

The permeability of laminated tubing consisting of two layers of polyethylene bonded by styrene vapors is only one-third of that of a two-layer heat-and-pressure bonded polyethylene tube, whereby the excellent barrier effect of polyethylene against water vapor is not impaired.

Instead of styrene vapors, those of other monomers polymerizable to form thermoplastics may be employed.

Beneficial results comparable to those described in connection with styrene are obtainable when using vinyl chloride or butadiene. In addition to improved mechanical strength, such polymerizable monomers provide reduced permeability to gases and vapors.

The reaction which occurs when styrene in the gaseous state is reacted with nylon and polyethylene under the conditions prevalent in the space 7 adjacent the extrusion die are represented by the following formulas:

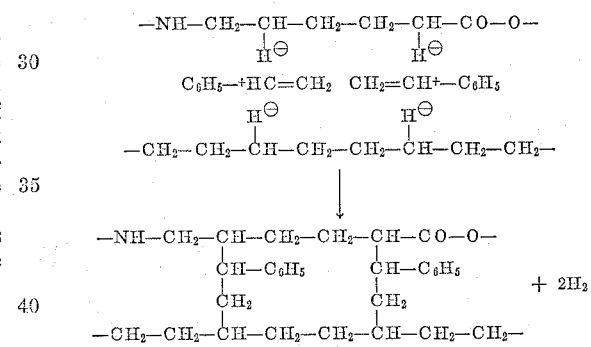

When the polyamide layer in the above examples is replaced, for instance, by polyvinyl chloride, polystyrene, or polyurethane to be bonded to a polyethylene layer by being simultaneously extruded under the conditions of the examples a corresponding increase in bond strength is also observed. With even small amounts of ozone, with adequate concentrations of chlorine, and with other reactive gases bonds much stronger than usual can be readily obtained.

It is immaterial whether the reactive gas is supplied from the outside, or whether it is generated in the space between the layers to be bonded by electrical discharge or otherwise. Ozone may be generated from oxygen in situ also by ultra violet or other actinic radiation. Where the reactive gas is supplied from the outside, I prefer to maintain its activity by continuously replenishing it as by continuously passing it through the annular space 7.

The amount of the reactive gas to be supplied depends on the rate of extrusion. An increase of the rate of extrusion results in a shortening of the time of reaction of the gas with the plastic material, and thus calls for an increase of the rate of gas supply. Also, the larger the amount of plastic material is which is extruded, the larger are the amounts of products (monomolecular and low molecular products) split off by the plastic material, and such increase in split-off products requires larger amounts of reactive gas since the reactive gas would otherwise become too quickly diluted.

It will be apparent that the admitting passages for reacting gas must be of a larger cross sectional area than the discharging passages, so that no overpressure will build up in the space 7 and lead to an expansion of that space.

It is to be noted that provisions must be made for quick and easy admission of fresh gases and just as quick and easy discharge of exhaust gases.

The method of the invention is not limited to tubing laminated from two film layers, but is useful as well in the production of multi-layer tubing in which all or some of the bonds between adjacent layers may be produced by my method. The adaptations of the apparatus illustrated which will be necessary for the production of such multi-layer tubing will readily suggest themselves to those skilled in the art.

The product obtained by the method of the invention has not only outstanding mechanical strength, but its permeability may be substantially reduced as compared with that expected from mere superimposition of the component layer.

The tubing of the invention can, of course, be made into flat material to be used as flat laminates.

I have found that the laminated tube of my invention can be converted into shrinkable tubing, that is tubing which can be shrunk by heating to its softening temperature, without losing its improved mechanical strength and reduced permeability. The shrinkable tubing may be made from the tube of the invention in any known way. It has further been found that my laminated tube may most advantageously be used to be made into containers, toys or any other hollow bodies. In either of these two cases, as well as in other cases where freshly extruded tubing is worked on, by extrusion apparatus may be closely associated with completing apparatus, such as is used to make the shrinkable tubing or to press or blow containers and the like, etc.

The great advantages offered by my invention will be seen from the fact that a material, such as polyethylene which is permeable to oil, odors and organic gases, and impermeable to water vapors, can be united with nylon which is permeable to water vapors but impermeable to oil, odors and organic gases, resulting in an end product which is impermeable both to water vapors and the group of oil, odors and organic gases. In addition, the softness of polyethylene is compensated by the toughness of nylon.

The invention permits the manufacture of tubing of varying wall thickness and the bonding of layers of different wall thicknesses. It is often useful to bond together a more expensive material in thinner section and a less expensive material in thicker section.

The reactive gases employed for chemically or physically changing the surface properties of the superimposed layers may be diluted with inert materials such as nitrogen of air. When compared with a highly active reagent such as ozone or fluorine, even atmospheric oxygen may be considered a diluent since it does not significantly improve bond strength between polyethylene and other thermoplastics. The several gases which are reactive under the conditions of my method may be employed in combination with each other, and their effects are additive as far as I have been able to determine.

It has been found that blowing cool air from the outside against extruded outer tubing within the annular extent between the orifices 18 and 3 (see FIG. 1) enhances the formation of the bond and helps prevent the inclusion of gas bubbles between bonded layers. While the blowing of cool air in any place between 18 and 3 is helpful, it is preferred to blow the air in the place indicated by the arrow A in FIG. 1.

Obviously, many modifications and variations of the present invention are possible in the light of the above teachings. It is therefore to be understood that within the scope of the appended claims the invention may be practiced otherwise than specifically described.

I claim:

1. A method of producing laminated tubing, comprising extruding at least two tubular formations of different thermoplastic materials difficultly susceptible to bonding, coaxially and spacedly issuing said formations, said formations forming an outer and an inner formation and constituting the layers of the laminated tubing being produced, said outer formation enclosing said inner formation and having an inner face, said inner formation having an outer face, admitting a fluid pressure medium into the interior of said inner formation and thus expanding same to fuse together with said outer formation approximately along a circle a distance away from the place of issuance of both of said formations, portions of said inner and outer faces defining a temporary space of annular cross section, introducing a gas into said space, capable of reacting with at least one of said portions, reacting said gas with at least said one portion, and bonding together said portions with the aid of said fluid pressure medium.

2. In the method as set forth in claim 1, passing said gas through said space in a substantially continuous flow.

3. A method as set forth in claim 1, wherein said gas is an oxidant.

4. A method as set forth in claim 1, wherein said gas is rendered reactive within said space so as to react with at least said one portion.

5. A method as set forth in claim 1, wherein said gas contains ozone.

6. A method as set forth in claim 1, wherein said gas contains oxygen, and a portion of said oxygen is transformed to ozone by an electric discharge.

7. A method as set forth in claim 6, wherein said electric discharge takes place in said space.

8. A method as set forth in claim 1, wherein one of said materials is polyethylene, and said gas is reactive with said polyethylene to increase the dipole moment thereof.

9. A method as set forth in claim 1, wherein said gas consists at least partly of a material polymerizable to form a thermoplastic material.

10. A method as set forth in claim 1, wherein said gas includes an amount of a gaseous material selected from the group consisting of a halogen, an oxide of sulfur, an oxide of nitrogen, an oxide of a halogen, boron trifluoride, sulfuryl chloride, oxygen, ozone, styrene, vinyl chloride, and butadiene, said amount being effective to increase the strength of the bond between said portions of said inner and outer faces, said one face portion being of polyethylene.

11. A method as set forth in claim 10, wherein said gaseous material is fluorine.

12. In the method as set forth in claim 1, blowing cold air from the outside against said outer formation before bonding together said face portions.

References Cited by the Examiner

UNITED STATES PATENTS

| | | | |
|---|---|---|---|
| 2,695,422 | 11/54 | Gray | 18—13 |
| 2,753,596 | 7/56 | Bailey | 156—156 |
| 2,957,201 | 10/60 | Fields et al. | 18—13 |
| 2,979,431 | 4/61 | Perrault | 156—244 |
| 3,008,862 | 11/61 | Haine et al. | 156—244 |
| 3,082,484 | 3/63 | Sherman | 156—244 XR |

FOREIGN PATENTS

| | | |
|---|---|---|
| 556,576 | 4/58 | Canada. |
| 1,028,325 | 4/58 | Germany. |

EARL M. BERGERT, *Primary Examiner.*